United States Patent [19]

Yasue

[11] Patent Number: 4,882,705
[45] Date of Patent: Nov. 21, 1989

[54] DATA TRANSMISSION SYSTEM INCLUDING THE DOWNLOADING OF A FIRST PROGRAM FOR THE INTERRUPTION OF A SECOND PROGRAM

[75] Inventor: Kazuo Yasue, Tokyo, Japan

[73] Assignee: NEC Corporation, Tokyo, Japan

[21] Appl. No.: 227,461

[22] Filed: Aug. 2, 1988

Related U.S. Application Data

[63] Continuation of Ser. No. 804,432, Dec. 4, 1985, abandoned.

[30] Foreign Application Priority Data

Dec. 7, 1984 [JP] Japan .................. 59-257365

[51] Int. Cl.⁴ .............................................. G06F 9/00
[52] U.S. Cl. .................................. 364/900; 364/975.1
[58] Field of Search ... 364/200 MS File, 900 MS File

[56] References Cited

U.S. PATENT DOCUMENTS

| | | | |
|---|---|---|---|
| 4,138,718 | 2/1979 | Toke et al. | 364/200 |
| 4,167,779 | 9/1979 | Sullivan et al. | 364/200 |
| 4,318,174 | 3/1982 | Suzuki et al. | 364/200 |
| 4,325,120 | 4/1982 | Colley et al. | 364/200 |
| 4,335,462 | 6/1982 | Maxwell et al. | 364/200 |
| 4,363,093 | 12/1982 | Davis et al. | 364/200 |
| 4,412,281 | 10/1983 | Works | 364/200 |
| 4,459,664 | 7/1984 | Pottier et al. | 364/200 |
| 4,468,750 | 8/1984 | Chamoff et al. | 364/900 |
| 4,489,379 | 12/1984 | Lanier et al. | 364/200 |
| 4,564,901 | 1/1986 | Tomlinson et al. | 364/200 |
| 4,598,364 | 7/1986 | Gum et al. | 364/200 |
| 4,782,442 | 11/1988 | Kojima et al. | 364/200 |

Primary Examiner—Gareth D. Shaw
Assistant Examiner—Adolfo Ruiz
Attorney, Agent, or Firm—Foley & Lardner, Schwartz, Jeffery, Schwaab, Mack, Blumenthal & Evans

[57] ABSTRACT

In a data transmission system in which a plurality of stations each including a processor are interconnected by links, each processor is constituted by a memory device, which when receives a command containing a program from other station, stores a program contained in the command from a predetermined address, a register which, when receives the command representing a condition of starting the program, stores the information, an addressing circuit supplying an address signal to the memory device, a comparator comparing with each other the outputs of the addressing circuit and the register and a subroutine call means for executing the program when the output of the comparator shows a coincidence.

1 Claim, 6 Drawing Sheets

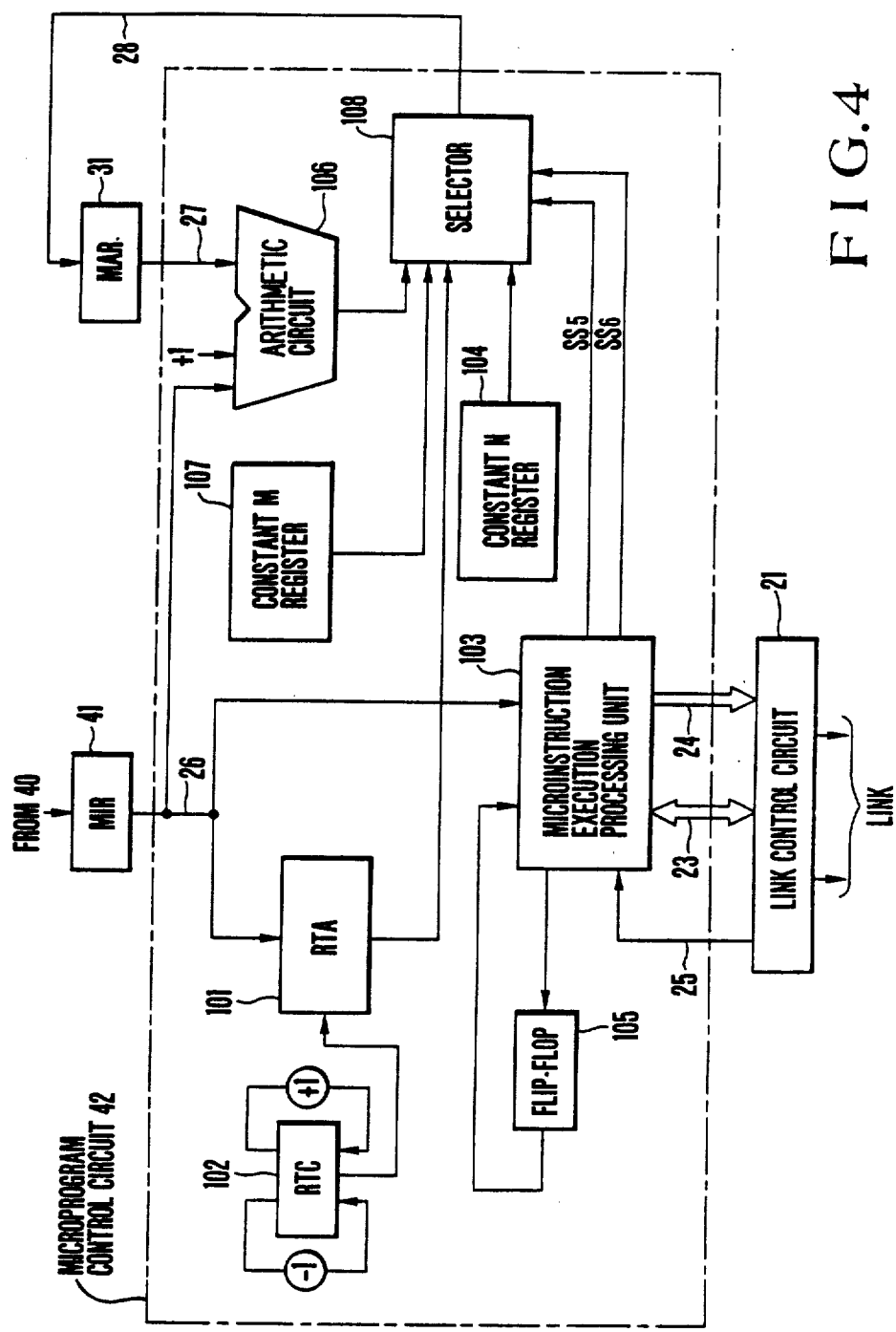
F I G. 4

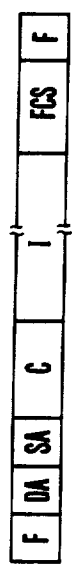
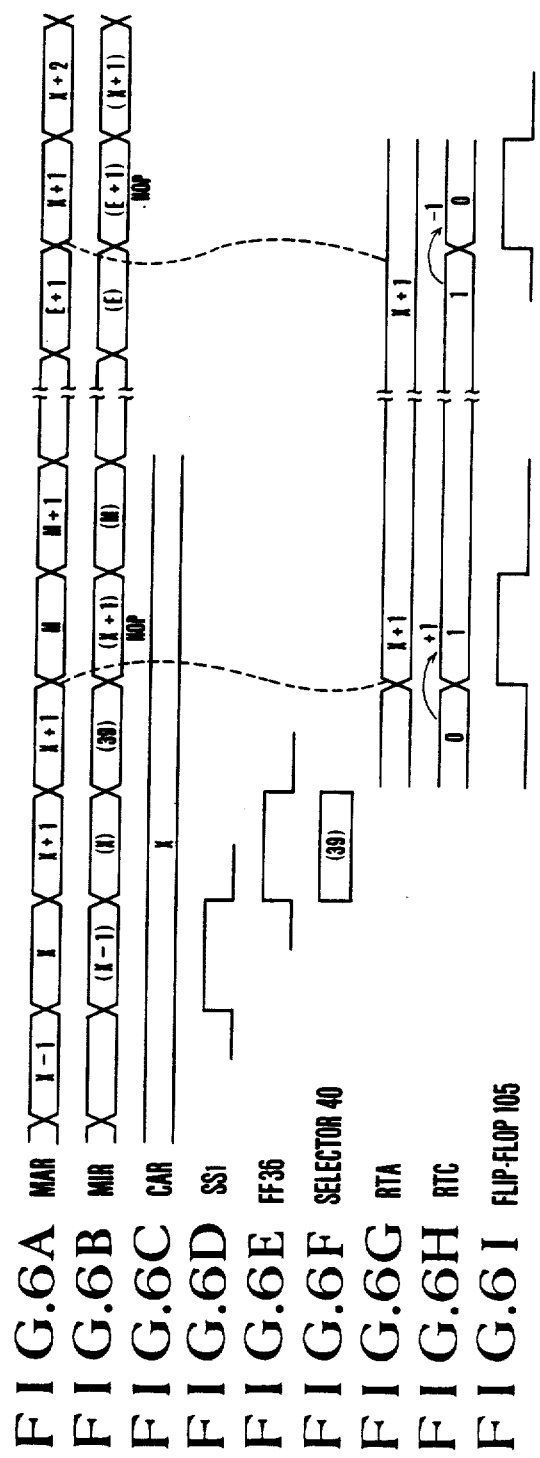

DATA TRANSMISSION SYSTEM INCLUDING THE DOWNLOADING OF A FIRST PROGRAM FOR THE INTERRUPTION OF A SECOND PROGRAM

This application is a continuation of application Ser. No. 804,432, filed Dec. 4, 1985, now abandoned.

BACKGROUND OF THE INVENTION

This invention relates to a data transmission system including data transmission links and a plurality of stations connected to the transmission links, and more particularly to the data transmission system wherein each station operates to monitor and accumulate states of other stations. This operation is termed a trace performance.

One example of a prior art data transmission system having a trace performance is disclosed in U.S. Pat. No. 4,335,426.

In the prior art data transmission system, since each station contains a program for tracing (tracer) which is not required to be used usually, the performance for the processes which are usually executed is decreased proportionally. Where a read only memory (ROM) device is used for storing the processing programs, as the trace performance is not included, it is impossible that a user can take out a trace information of a specific system state during operation or maintenance at any time desired.

SUMMARY OF THE INVENTION

Accordingly, it is an object of this invention to provide an improved data transmission system wherein respective stations connected to transmission links can manifest necessary trace performance whenever desired without decreasing the processing performance usually executed.

According to this invention there is provided a data transmission system comprising a transmission link, and a plurality of stations connected to the transmission link. Each station includes link control means connected to the transmission link and processors connected to the link control means. Each processor includes means for transmitting a first command including a subroutine to be executed by other stations, and a second command representing a condition of starting execution of the subroutine, means supplied with a microinstruction for executing the same, memory means which, upon receipt of the first command from one of the other stations, stores an information contained in the first command at a predetermined address, register means which, upon receipt of the second command, stores an information contained in the second command, addressing means for supplying the address to access the memory means, comparator means for comparing the output of the addressing means with the output of the register means, and a subroutine calling means for causing the microinstruction execution means to execute the subroutine when the output of the comparator means shows a coincidence.

BRIEF DESCRIPTION OF THE DRAWINGS

In the accompanying drawings;

FIG. 4 is a block diagram showing one example of a microprogram control circuit utilized in the processor shown in FIG. 3;

FIG. 5 shows the construction of a frame utilized in the data transmission system embodying the invention;

FIGS. 6A through 6I are timing charts for explaining the operation of this invention and FIGS. 7, 8 and 9 are block diagrams showing other embodiments of the data transmission system embodying the invention.

DETAILED DESCRIPTION OF THE PREFERRED EMBODIMENTS

Figure 1:
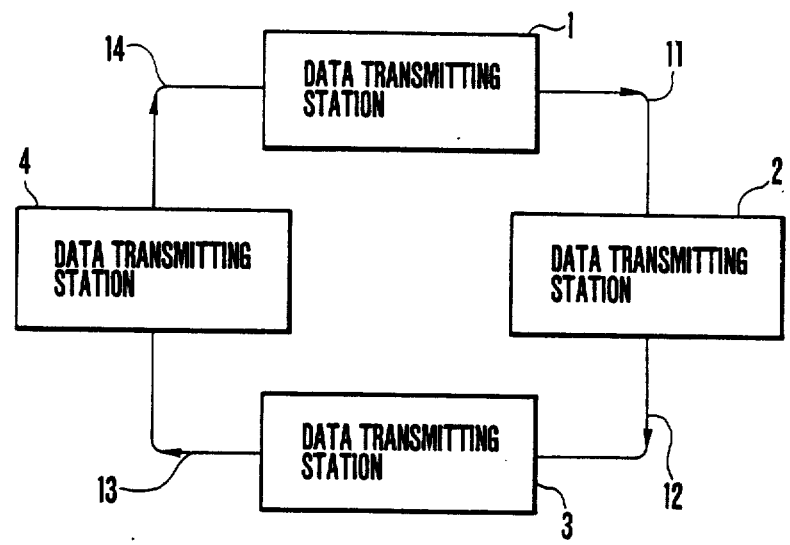
FIG. 1 is a block diagram showing the construction of one example of a data transmission system embodying the invention.

A data transmission system shown in FIG. 1 comprises stations 1, 2, 3 and 4, and links 11, 12, 13 and 14 for connecting the stations 1–4 into a loop. A signal on the links is transmitted in one direction as shown by the arrows.

Figure 2:
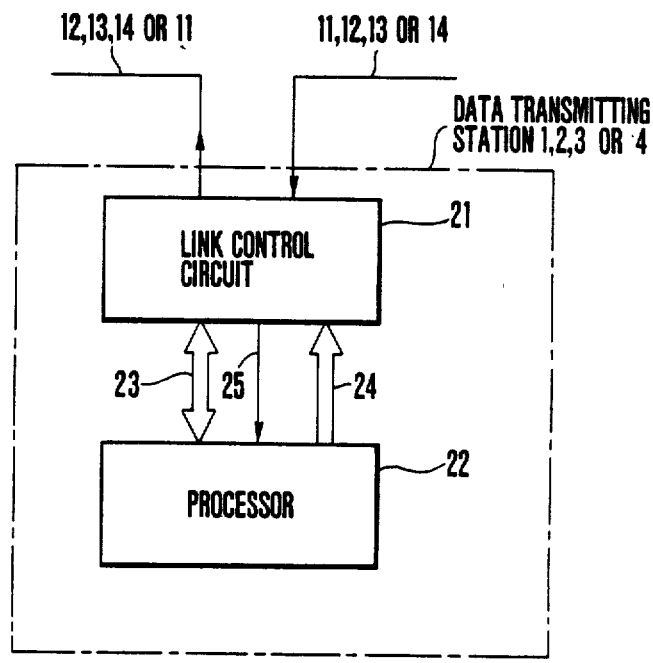
FIG. 2 is a block diagram showing one example of the construction of each station shown in FIG. 1.

As shown in FIG. 2, each station comprises a link control circuit 21 connected to corresponding links for controlling the inputting and outputting of information and a processor 22 for controlling the link control circuit 21 for receiving and transmitting various informations. The link control circuit 21 and the processor 22 are interconnected by a bidirectional data bus 23, a signal line group 24 for transmitting control signals which control the link control circuit 21 from processor 22, and an interruption line 25 for transmitting an interruption signal to processor 22.

Figure 3:
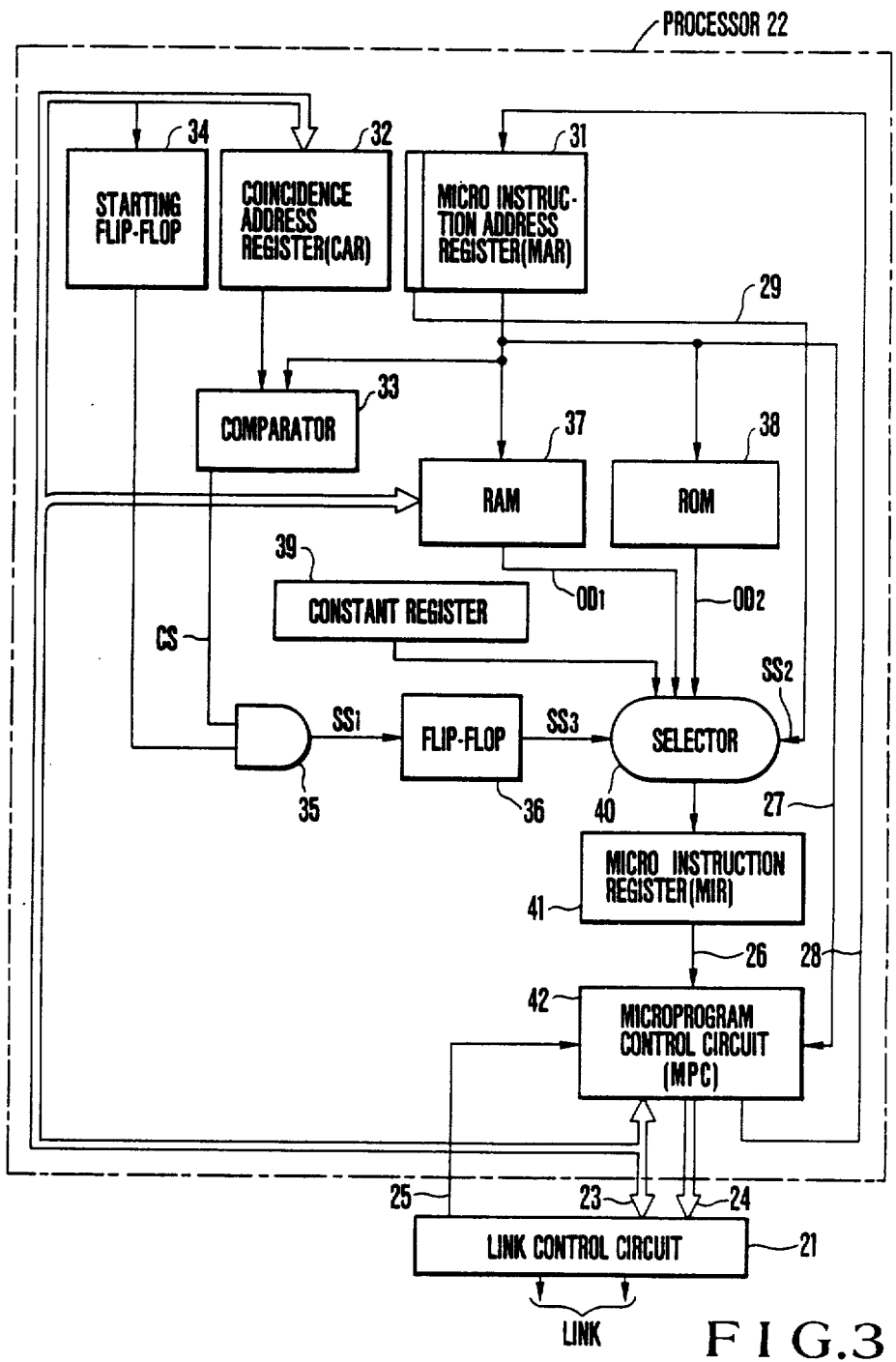
FIG. 3 is a block diagram showing one example of a processor utilized in the station shown in FIG. 2.

FIG. 3 shows one example of the construction of processor 22. As shown, the data bus 23, the signal line group 24 and the interruption line 25 are connected to a microprogram control circuit (referred to as MPC hereinafter) 42 of the processor 22. Furthermore, the data bus 23 is connected with the input of a coincidence address register (referred to as CAR hereinafter) 32, the input of a starting flip-flop 34 and the data line of a random access memory (RAM) 37. A microinstruction address register (referred to as MAR hereinafter) 31 is supplied with data including the address of the microinstruction from the MPC 42 via a control line 28. The most significant bit (MSB) of the MAR 31 is applied to a selector 40, as a selection signal $SS_2$ for controlling the selecting operation of the selector 40. All the bits of the MAR 31 are applied to the MPC 42 through a connecting line 27, to the RAM 37 and ROM 38 as respective addresses and to one input of a comparator 33. The MSB of each of the addresses supplied to the ROM 38 is zero, while that supplied to the RAM 37 is one. The other input terminal of the comparator 33 is connected to the CAR 32. The outputs of the comparator 33 and the starting flip-flop 34 are supplied to the inputs of an AND circuit 35. The comparator 33 compares the outputs of the CAR 32 and the MAR 31. When the both outputs coincide with each other, the comparator 33 outputs a coincidence signal CS of logic one ("1"), and the AND circuit 35 supplies a selection signal $SS_1$ to flip-flop 36. The selection signal $SS_1$ becomes "1" when the signal CS is "1" and the output signal of the starting flip-flop 34 is also "1". A flip-flop 36 supplies a selection signal $SS_3$ to one input terminal of the selector 40. The outputs $OD_1$ and $OD_2$ of RAM 37 and ROM 38 are supplied to respective input terminals of the selector 40. There is provided a constant register 39 storing a branch microinstruction as a constant, the register 39 being connected to one input terminal of the selector 40. The selector 40 selects the output $OD_2$ of the ROM 38 when the selection signals $SS_2$ and $SS_3$ are both logic zero ("0"), selects the output $OD_1$ of the RAM 37 when selection signals $SS_2$ and $SS_3$ are "1" and "0" respectively and selects the output of the register 39 when the selection signals $SS_2$ and $SS_3$ are "0" and "1" respectively, and supplies the selected signal to a microinstruction register (referred to as MIR hereinafter) 41. The MIR 41 sends to the MPC 42 via connecting line 26 the selected data to act as a microinstruction.

FIG. 4 shows one example of the construction of the MPC 42 of the processor 22 shown in FIG. 3. In FIG. 4, the output of the MIR 41 is supplied to a memory device (RTA) 101 and a microinstruction execution processing unit (referred to as processing unit hereinafter) 103 via a connection line 26. When the inputted microinstruction is either one of a subroutine call, an interruption and the "branch" from the register 39, the RTA 101 holds the execution of the microinstruction represented by the MAR 31, to be described later. The RTA 101 is supplied with address signals from register 102 capable of up or down counting by one. The data bus 23, signal line group 24 and interruption line 25 are connected to the processing unit 103. A flip-flop 105 is also connected to the processing unit 103 for invalidating the execution of a microinstruction.

The output of the MAR 31 is applied to an arithmetic circuit 106 via connecting line 27, which counts up by +1 except for branch microinstructions. The output of the arithmetic circuit 106 is supplied to one input terminal of a selector 108. A constant N register 104 and constant M register 107 store and supply to the selector 108 constants N and M respectively. The selector 108 is also supplied with selection signals $SS_5$ and $SS_6$ from the processing unit 103. When both of the selection signals $SS_5$ and $SS_6$ are "0", that is at the time of executing an ordinary microinstruction, the selector 108 selects the output of the arithmetic circuit 106. When the selection signals $SS_5$ and $SS_6$ are "0" and "1" respectively, that is at the time of generating an interruption signal, the selector 108 selects the output of the constant N register 104 during one cycle after generation of the interruption signal. When the selection signals $SS_5$ and $SS_6$ are respectively "1" and "1", that is when a branch microinstruction is being executed, the selector 108 selects the output of the constant M register 107. Further, when the selection signals $SS_5$ and $SS_6$ are respectively "1" and "0", that is at the time of executing a microinstruction for leaving a subroutine, the selector selects the output of RTA 101. The signals selected in respective cases are supplied from selector 108 to the MAR 31 via connecting line 28.

FIG. 5 shows the construction of a frame generally used in this invention. The frame normally flowing through links 11-14 shown in FIG. 1 is constituted by a flag pattern F representing "01111110", a destination station address DA, a sending station address SA, a control information C, a data information I and check bits FCS which are used to perform the circulating redundancy check. In a certain case, the data information I can be omitted.

The operation of the data transmission system shown in FIGS. 1-5 will now be described with reference to FIGS. 6A through 6I showing the timings of the signals at principal portions. In FIGS. 6B and 6F, for example, (X) represents the content of address X.

Assume now that the station 4 wants to obtain a traced information about a specific processing routine executed in the station 1.

At first, station 4 transmits to the station 1 a command A representing a trace information request according to the frame format shown in FIG. 5. When the link control circuit 21 of the station 1 receives the frame of the command A, the frame is written into a buffer memory, not shown, in the link control circuit 21. At the same time, the link control circuit 21 generates an interruption signal on the interruption line 25. In response to the interruption signal, the MPC 42 in the processor 22 sends a request signal for requesting the control information C, to the link control circuit 21 through the signal line group 24. Then the link control circuit 21 sends the control information C to the MPC 42 through the data bus 23. When the control information C is recognized as command A, the MPC 42 sends a request signal for requesting the data information I to the link control circuit 21 through the signal line group 24. Then the link control circuit 21 sends to the MPC 42 through the data bus 23 the data information I which is stored in the buffer memory, not shown. The MPC 42 writes the data information I in a memory area of the RAM 37 starting from a predetermined address M as a trace program, to be described later, thus terminating the operation of the command A.

Then station 4 sends to station 1 a command B which is to be set in the CAR 32 and the starting flip-flop 34 in the station 1, in the same manner as transmitting command A. When the link control circuit 21 of the station 1 receives the frame of command B, an interruption signal is generated on the interruption line 25, which is informed to the processor 22. Upon received of an interruption signal, the MPC 42 in the processor 22 requests and then receives the control information C in the same manner as in the case of the command A. When the command B is recognized in accordance with the control information C, the MPC 42 requests the data information I and then receives it in the same manner as in the case of the command A. When the data information I is received, a value designated by the station 4 and contained therein (in this embodiment it is designated as X) is set in the CAR 32. Furthermore, "1" is set in the starting flip-flop circuit 34, thus terminating the operation of command B.

In station 1, since "1" is set in the starting flip-flop 34, when the value of the MAR 31 becomes X while the microinstruction stored in the ROM 38 are sequentially executed, the coincidence signal CS outputted from the comparator 33 becomes "1". Accordingly, the selection signal $SS_1$ outputted from AND circuit 35 becomes "1" so that the output $SS_3$ of the flip-flop circuit 36 becomes "1" during one microinstruction cycle. As a consequence, selector 40 selects the output of the constant register 39 so as to set a branch microinstruction in MIR 41. While the output $SS_3$ of the flip-flop 36 is "1" during one cycle, counting up of the address is prevented. In the MPC 42, the branch microinstruction is executed by the processing unit 103. Then, a value $X+1$ is set in the memory location assigned by the RTC 102, in the RTA 101, and the RTC 102 counts up $+1$. When the branch microinstruction is executed the selection signals $SS_5$ and $SS_6$ become "1" and "0" respectively so that selector 108 selects the output of the constant M register 107. The output of the constant M register 107 is set in the MAR 31 via the connecting line 28. Concurrently therewith, as the flip-flop 105 is set during one cycle, the next microinstruction is not executed, that is in the NOP (no operation) condition. The value M, whose MSB is "1", set in the MAR 31 represents the start address of the trace program written in RAM 37 according to command A. When the processing of this program is completed, an instruction E included in the program which sets to the MAR 31 a value held by a register in the MPC 42 would be executed so that the processing unit 103 changes both selection signals $SS_5$ and $SS_6$ to "1". At this time, the RTC 102 counts down by one and the content $(X+1)$ of RTA 101 is selected by the selector 108 and set in the MAR 31. At the same time, since the flip-flop circuit 105 is set during one cycle, the next microinstruction would be rendered NOP and the instruction $(X+1)$ is executed in the next cycle, thus returning to the original microprogram stored in the ROM 38.

The foregoing operation corresponds to an operation wherein the station 4 writes the program into station 1 and the station 1 utilizes the program as a subroutine. Unless the starting flip-flop 34 is reset, each time the content of the MAR 31 becomes X, the above described subroutine would be executed. In other words, station 4 can cause the station 1 to repeatedly execute a desired subroutine without affecting the microprogram already stored in the station 1. The station 1 can store a result of processing at a microinstruction level and the number of the processings in specific areas of the RAM 37. These areas can be accessed by a command C representing the trace request from all stations. For example, when station 4 sends the command C to station 1 an interruption instruction is applied to the MPC 42 of the processor 22 by a similar operation to that in the case of command A and B. Consequently, the MPC 42 interprets that the applied command is the command C when it reads out a control information C in the frame so as to send a trace information in the RAM 37 to the link control circuit 21 via the data bus 23. The link control circuit 21 transmits to the station 4 the flag pattern F, destination station address DA, sending station address SA, control information C, data information I check bit FCS and flag pattern F in the order mentioned according to the format of the frame.

When it becomes unnecessary to provide the trace performance, this can be done by sending a command D from station 4 to station 1. In the same manner as in the cases of commands A, B, and C, the MPC 42 is subjected to an interruption in accordance with the command D and the MPC 42 interprets that it is the command D so as to reset the flip-flop 34, thus ending the processing of command D. Consequently, even when the contents of CAR 32 and the MAR 31 coincide with each other, the selection signal $SS_1$ of the output of AND circuit 35 would not become "1" so that the content of the constant register 39 is not set in the MIR 41.

Figure 7:
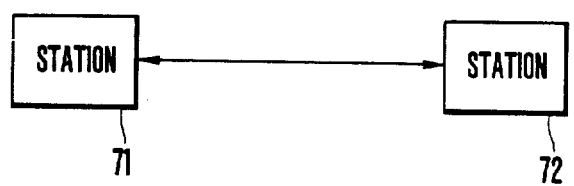
Figure 8:
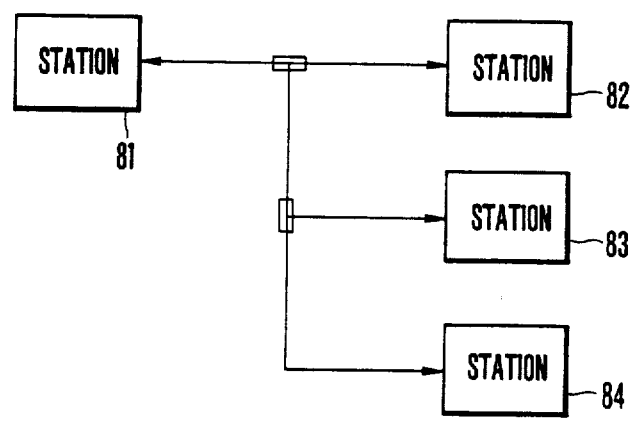
Figure 9:
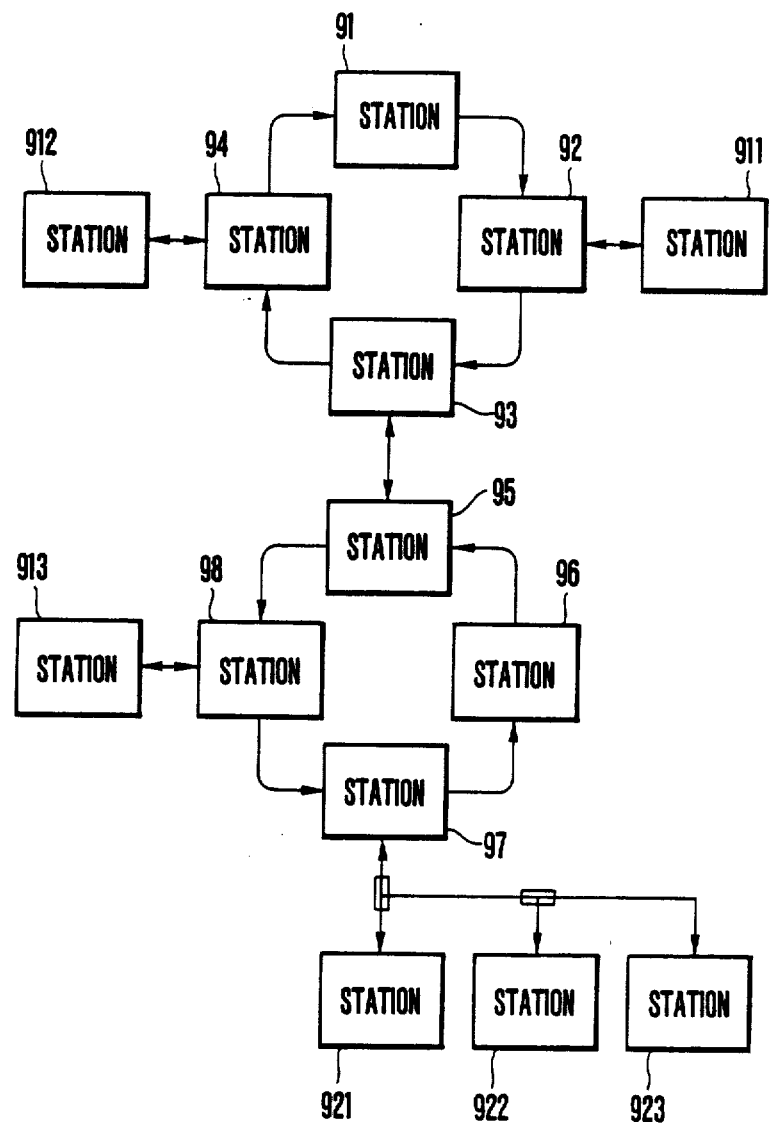

Although in the foregoing embodiment the data transmission system was assumed to be a loop shape as shown in FIG. 1, it will be clear that the invention is not limited to this shape and that the invention is also applicable to data transmission systems having constructions as shown in FIGS. 7, 8 and 9 for example. In FIGS. 7, 8, and 9, each station can transmit informations to all other stations of the data transmission system in the same manner as in FIG. 1. However, in the modification shown in FIG. 9, stations, for example 92, 93, 94, between other stations 911 and 912 which communicates with each other merely execute a conversion processing of a command.

In the foregoing embodiments, although a single starting flip-flop circuit 34 and a single coincidence address register 32 were provided, a plurality of these elements can be provided. Furthermore, the constant M of the constant M register 107 shown in FIG. 4 may be changed when a microinstruction is executed.

What is claimed is:

1. A data transmission system comprising:

a transmission link;

at least one first station connected to said transmission link; and a plurality of second stations connected to said transmission link;

said first station including means for transferring to a selected one or more of said second stations a first program and a first address representing a condition to start execution of the first program in said second station;

each of said second stations including first storage means for storing a second program prior to the transferring of the first program and first address, second storage means for storing the first address transmitted from said first station, third storage means for storing the first program transferred from said first station in a storage area starting from a third address, address register means for sequentially storing second addresses for addressing said first storage means and said third storage means, means for executing the programs stored in said first storage means and said third storage means in accordance with the second addresses sequentially stored in said address register means, coincidence detecting means for detecting a coincidence between the first address stored in said second storage means and the second address stored in said address register means during execution of said second program, and means for interrupting, after the first program and the first address are transferred from said first station to said second station, the execution of the second program to start execution of the first program stored in said third storage means by storing the third address into said address register means when said detecting means detects the coincidence during execution of said second program, the second program continuing to be executed if the coincidence is not detected during the execution thereof.

* * * * *